Aug. 25, 1931.  B. VAN PATTEN  1,820,511
EARTH BORING DRILL
Filed Aug. 15, 1927
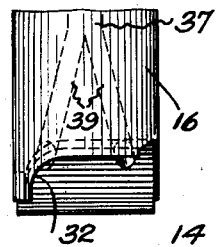
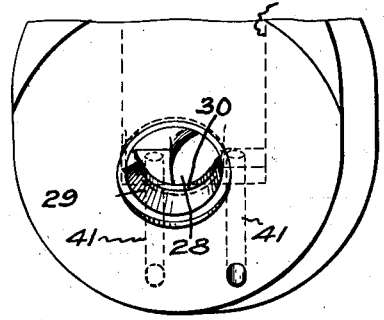
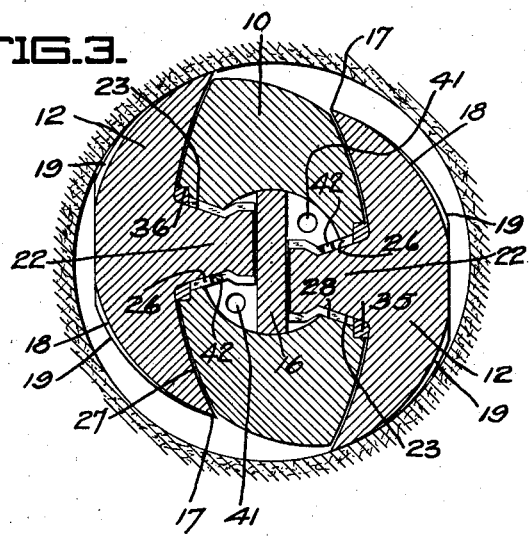
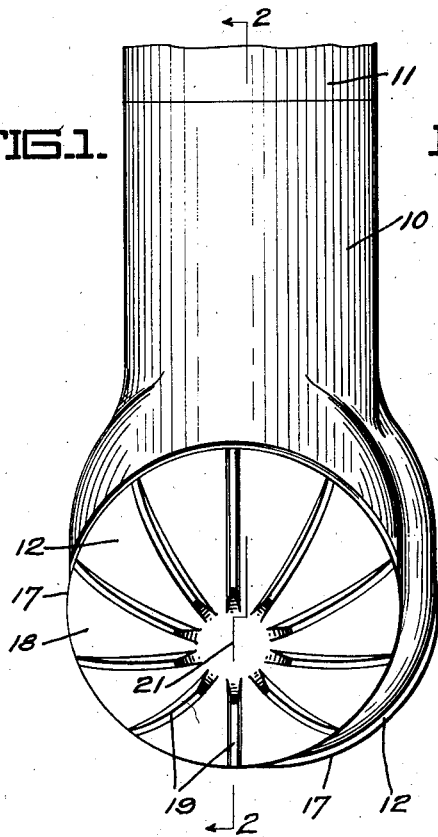
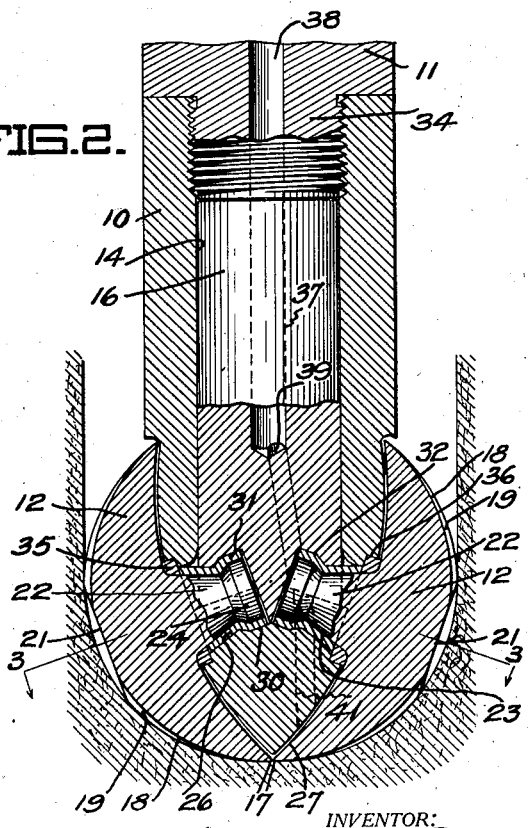
INVENTOR:
Burton Van Patten
BY
White, Prost & Fryer
ATTORNEYS.

Patented Aug. 25, 1931

1,820,511

UNITED STATES PATENT OFFICE

BURTON VAN PATTEN, OF BREA, CALIFORNIA

EARTH BORING DRILL

Application filed August 15, 1927. Serial No. 212,873.

This invention relates generally to drills for boring earth wells, particularly drills of the rotary type.

It is an object of this invention to devise improved means for retaining one or more cutters upon a rotary drill shank.

It is a further object of this invention to devise a rotary drill in which the cutters are detachably retained in assembled relationship upon a drill shank by means of a single threaded engagement between the drill shank and drill stem.

It is a further object of this invention to generally improve upon the construction of rotary cutters for rotary disc drills whereby such drills will operate more efficiently and will require less frequent sharpening and replacement.

Further objects of this invention will appear from the following description in which I have set forth the preferred embodiment of my invention. It is to be understood that the appended claims are to be accorded a range of equivalents consistent with the state of the prior art.

Referring to the drawings:

Figure 1 is a side elevational view showing a rotary earth drill constructed in accordance with this invention.

Fig. 2 is a cross sectional view taken along the line 2—2 of Fig. 1.

Fig. 3 is a cross sectional view taken along the line 3—3 of Fig. 2.

Fig. 4 is a detail showing the construction of the mandrel for detachably retaining the cutters upon the drill shank.

Fig. 5 is a detail illustrating the construction of the lower end of the drill shank with one of the cutters removed.

The invention may be outlined briefly as comprising a drill shank to the lower end of which is secured one or more cutters. The shank is made hollow so as to receive a removable mandrel which serves to engage the cutters so as to detachably retain them upon the drill shank. The mandrel in turn is retained in place by the screw engagement between the drill shank and drill stem. The cutters are preferably rotatable relative to the drill stem and are each constructed with spherical outer faces.

The axes of rotation of these cutters are preferably offset with respect to the vertical axis of rotation of the drill shank, and are likewise inclined to the horizontal so that the cutting edges are inclined inwardly toward the bottom of the drill. In order to provide a minimum number of parts and in order to provide for strength and durability, each cutter is formed with an integral projection which serves as bearing stud.

Referring to the drawings for a more complete description, I have shown a rotatable earth drill comprising a body or shank 10 to the upper end of which is secured the usual drill stem 11. Operatively retained upon the lower end of shank 10 are the cutters 12 which will be presently described in detail. The shank 10 is provided with an axial bore 14 which extends down from the top of the shank to the lower end thereof. Positioned within this bore there is a member 16 which may be termed a mandrel, and which serves the purpose of operatively retaining the cutters in position.

While the mandrel 16 may be utilized for retaining various kinds of cutters upon a drill shank, I have incorporated a novel form of rotary cutter which is shaped to provide a substantially circular cutting edge 17 and an outer spherical shaped face 18. Positioned upon the spherical face 18 and extending inwardly from the cutting edge 17, there are a plurality of spaced ribs 19 which operate to cause positive rotation of the cutters and which also exert a cutting effect upon the formation. The central portion of the spherical face 18 is preferably flattened as indicated at 21 and the inner ends of ribs 19 terminate adjacent the periphery of the flattened portion.

For journaling the cutters upon the drill shank 10, I preferably provide each cutter with an integral stud 22 which projects from the inner face of the same. This stud is preferably formed with a conical or tapered portion 23 and flanged end portion 24. It is journaled within a suitable split bushing 26, which in turn is fixedly clamped within the body of the drill, in a manner which will be presently explained.

The pivotal axis of each cutter upon the drill shank is preferably offset from the axis of rotation of the drill as shown in Fig. 3. Likewise the axes of rotation are inclined to the horizontal as shown in Fig. 2, so that the cutters toe inwardly at the bottom. Because of this peculiar positioning of the cutters, the cutting edge is presented to the formation at the bottom of the hole at substantially the same angle with which it is presented to the side walls, thus causing the cutting edge to be maintained automatically as the cutters are worn away in use. Furthermore the respective cutting edges approach so close together at the bottom of the drill that the formation of a central core is prevented. The ribs 19 are also forced into positive engagement with the formation being cut at the bottom of the hole thus causing positive rotation of the cutters, while when moving along the sides of the hole they exert a shearing and cutting action. If desired the inner face 27 of each cutter may be formed concave as shown in order to maintain a more acute cutting edge For receiving and positioning the bushings 26 of the cutters, the lower end of drill shank 10 is provided with apertures or openings 28 which are sufficiently large in diameter to permit bushing 26 to be bodily inserted in the same when assembled upon the cutter. The lower side of this aperture is defined by a conical shaped surface 29 upon which the exterior conical portion of bushing 26 is adapted to be seated, and also with a recess 30 which is adapted to receive portion 31 of the bushing surrounding the flange portion 24.

The mandrel 16 serves as a means for securely clamping bushings 26 in position so that they are securely interlocked within the recesses 30. The lower end of mandrel 16 is thus formed with recesses 32 which fit about the upper surfaces of bushings 26 and securely clamp the same in place. As a means for forcing mandrel 16 down upon the bushings, I preferably make the same sufficiently long that its upper end may abut the threaded projection 34 of stem 11. Thus the threaded connection between shank 10 and stem 11 serves as a means for removably securing the cutters to the shank. To provide a thrust bearing for each cutter, I preferably provide a ring 35 which may have a press fit with recess 36.

For lubricating the cutters the mandrel 16 may be provided with a passage 37 adapted to communicate with passage 38 in drill stem 11. At the lower portion of mandrel 16, the fluid may be passed thru branch passages 39 by means of which the lubricating mud is eventually discharged thru passages 41 in the lower end of shank 10. This positioning of passages 41 discharges the lubricating mud adjacent the bottom of the hole being drilled and at a point with respect to the cutters so as to be most effective in removing the cuttings. Oil lubrication may be provided for the studs 22 of the cutters, although in lieu thereof I prefer to pass a portion of the lubricating mud into the bushings 26, as by means of passages 39.

It is apparent that the invention described above involves many desirable features which make it a highly practical and efficient tool for drilling oil wells. There are no nuts or other parts which may become loosened during drilling operations since the threaded engagement between the drill shank and drill stem serves as the sole means whereby the cutters are detachably retained in place. Furthermore the form and positioning of the cutters makes it possible to operate the drill over long periods without a marked decrease in its cutting efficiency due to the fact that the cutters will maintain their cutting edges and will not become flattened. Because of the integral nature of the bearing studs, a stud and cutter may be formed of one piece of material, thus providing a structure of superior strength and durability.

I claim:

1. In a rotary drill, a rotatable drill shank having an axial bore extending downwardly into the drill body, a cutter having a stud projecting from the same and secured thereto, the lower portion of the shank having an opening to receive said stud, and a member insertable into said bore thru the upper end of the shank and adapted to detachably journal the stud of said cutter upon the shank.

2. In a rotatable drill, a drill shank, a stem having threaded connection with the shank, a cutter rotatable with respect to said shank, said cutter having a stud adapted to be received in an opening in the shank, and means disposed within the shank for operably retaining said stud within the shank, said means being normally urged in operative cutter retaining position by the threaded engagement between the stem and shank.

3. In a rotatable drill, a drill shank having an axial bore extending downwardly thru the same, a cutter adapted to rotate with respect to the shank, a bearing stud projecting from the cutter, said shank having an opening adapted to receive the stud, a member slidably disposed within said bore, the lower end of said member being adapted to retain said stud within the shank, the upper end of said member being adapted to be forced downwardly by the connection between the shank and stem.

4. In a rotatable drill, a drill shank having an axial bore extending downwardly in the same, a pair of cutters adapted to rotate with respect to the shank, said cutters each having flanged bearing studs projecting from the same, the lower portion of the shank having openings for receiving said studs, said openings being arranged so that the axis of the studs are inclined and offset laterally with respect to the axis of rotation of the shank, a mandrel disposed within the shank and having its lower end formed to interlock with the flanges of said studs, and means for operably retaining said mandrel within the shank.

5. In a rotatable earth drill, a rotatable cutter having a circular cutting edge, a spherical outer face, and ribs formed upon said face.

6. In a rotatable earth drill, a shank having a longitudinal bore, a plurality of cutters each having a stud secured thereto, said studs each being recessed, said shank being formed to receive said studs, and means for detachably locking said cutters to the shank comprising a single member disposed within the shank and formed at its lower end to effect an interlocking engagement with said recesses.

7. In a rotatable earth drill, a shank having a longitudinal bore, a plurality of rotatable cutters each having a bearing stud secured thereto, said studs each being recessed, said shank having openings to receive said studs, and means for detachably locking said studs within the shank comprising a single member formed at its lower end to effect interlocking engagement with said recesses.

8. In a rotatable earth drill, a shank having a bore extending downwardly within the same, a pair of rotatable cutters each having a bearing stud, the stud of each cutter being recessed, said shank having spaced lateral openings adapted to receive said studs, and a single member disposed in said bore and insertable from the upper end of the shank for detachably retaining the cutters upon the shank, said member having one end thereof formed to engage in said recesses.

9. In a rotatable drill, a shank having a bore extending downwardly within the same, a pair of rotatable cutters each having a bearing stud, said shank having spaced lateral openings adapted to receive said studs, and a single member disposed in said bore and insertible from the upper end of the shank for rotatably retaining the studs upon the shank, said member serving as the sole means for locking said cutters in operative position upon the shank.

10. In a rotatable earth drill, a rotatable cutter having a circular cutting edge on its periphery, a spherical outer face, ribs formed along said face, and an integral bearing stud projecting laterally from the inner face of the cutter.

11. A rotatable earth drill comprising a shank, and a pair of rotatable cutters journaled upon said shank to rotate about axes arranged at an angle to the axis of rotation of the shank, each of said cutters comprising a body having an outer spherical face and teeth formed upon said face and having a peripheral cutting edge.

In testimony whereof, I have hereunto set my hand.

BURTON VAN PATTEN.